(12) United States Patent
Cho

(10) Patent No.: US 12,511,894 B2
(45) Date of Patent: Dec. 30, 2025

(54) APPARATUSES FOR DRIVING ASSISTANCE AND METHODS FOR DRIVING ASSISTANCE

(71) Applicant: HL Klemove Corp., Incheon (KR)

(72) Inventor: Hanshin Cho, Seongnam-si (KR)

(73) Assignee: HL Klemove Corp., Incheon (KR)

( * ) Notice: Subject to any disclaimer, the term of this patent is extended or adjusted under 35 U.S.C. 154(b) by 188 days.

(21) Appl. No.: 18/240,563

(22) Filed: Aug. 31, 2023

(65) Prior Publication Data

US 2024/0212338 A1 Jun. 27, 2024

(30) Foreign Application Priority Data

Dec. 23, 2022 (KR) ........................ 10-2022-0183179

(51) Int. Cl.
| | |
|---|---|
| *G06V 10/98* | (2022.01) |
| *G06V 10/80* | (2022.01) |
| *G06V 20/56* | (2022.01) |
| *G07C 5/02* | (2006.01) |

(52) U.S. Cl.
CPC ............ *G06V 10/98* (2022.01); *G06V 10/803* (2022.01); *G06V 20/588* (2022.01); *G07C 5/02* (2013.01)

(58) Field of Classification Search
CPC .... G06V 10/98; G06V 10/803; G06V 20/588; G07C 5/02
USPC ........................................................ 348/148
See application file for complete search history.

(56) References Cited

U.S. PATENT DOCUMENTS

| | | | | |
|---|---|---|---|---|
| 2019/0351901 | A1* | 11/2019 | Hori | ...................... B60W 40/06 |
| 2020/0247406 | A1 | 8/2020 | Huang | |

FOREIGN PATENT DOCUMENTS

| | | |
|---|---|---|
| KR | 20140133332 A | 11/2014 |
| KR | 20160068144 A | 6/2016 |
| KR | 20200063670 A | 6/2020 |
| KR | 20200074488 A | 6/2020 |
| KR | 20210056589 A | 5/2021 |
| KR | 20210079676 A | 6/2021 |

OTHER PUBLICATIONS

Korean Office Action corresponding to KR Application No. 10-2022-0183179; issued Sep. 30, 2024 (12 pages, including English machine translation).

* cited by examiner

*Primary Examiner* — Jeffery A Williams
(74) *Attorney, Agent, or Firm* — Myers Bigel, P.A.

(57) ABSTRACT

Methods and apparatuses for driving assistance. In one example, an apparatus for driving assistance includes at least one memory including a stored program, and at least one processor configured to execute the stored program. The stored program is configured to cause the at least one processor to acquire behavior data of a vehicle from at least one behavior sensor provided in the vehicle, acquire at least one of image data acquired from at least one camera provided in the vehicle or image sensor information based on the image data, and correct lane line information included in the image sensor information based on the behavior data and the image sensor information when an error is present in the lane line information.

19 Claims, 9 Drawing Sheets

APPARATUSES FOR DRIVING ASSISTANCE AND METHODS FOR DRIVING ASSISTANCE

CROSS-REFERENCE TO RELATED APPLICATION

This application claims the benefit of Korean Patent Application No. 10-2022-0183179, filed on Dec. 23, 2022, in the Korean Intellectual Property Office, and the entire contents of the above-identified application are incorporated by reference herein.

BACKGROUND

Technical Field

Aspects of the present disclosure relate to apparatuses and methods for driving assistance, and in particular relate to apparatuses and methods for driving assistance in which information from various sensors is fused as part of recognizing a lane line.

Description of the Related Art

Vehicles are the most common transportation in modern society, and the number of people using vehicles continues to increase. Although there are many advantages from the development of vehicle technology, such as easy long-distance traveling and improved convenience of living, one problem that often occurs is that road traffic conditions deteriorate and traffic congestion becomes serious, especially in densely populated places such as Korea.

Recently, research has actively progressed on vehicles equipped with an advanced driver assistance system (ADAS), which may actively provide information on a vehicle state, a driver state, or a nearby environment in order to reduce a burden on a driver and enhance convenience.

For example, an ADAS mounted on vehicles may perform functions of lane departure warning (LDW), lane keeping assist (LKA), high beam assist (HBA), autonomous emergency braking (AEB), traffic sign recognition (TSR), adaptive cruise control (ACC), blind spot detection (BSD), or the like.

The ADAS may perform the above-described functions based on data acquired by at least one sensor of a radar, a light detection and ranging (LiDAR), or a camera.

SUMMARY

It is an aspect of the present disclosure to provide a system for fusing data and/or information from sensors, with the system capable of more accurately correcting lane line recognition information by e.g., fusing data acquired from the sensors provided in a vehicle. Systems for driving assistance, and methods of fusing the data and/or information from sensors are also provided.

Additional aspects of the disclosure will be set forth in part in the description which follows and, in part, will be apparent from the description, or may be learned by practice of the inventive concepts provided by the present disclosure.

In accordance with some aspects of the present disclosure, an apparatus for driving assistance may include at least one memory including a stored program, and at least one processor configured to execute the stored program. The stored program may cause the at least one processor to acquire behavior data of a vehicle from at least one behavior sensor provided in the vehicle, acquire lane line information from at least one of image data acquired from at least one camera provided in the vehicle or image sensor information based on the image data, identify that an error is present in lane line information included in the image data or the image sensor information, and correct the lane line information based on the behavior data and the image sensor information.

The behavior data may include data on at least one of a steering angle, a steering speed, a yaw rate, or a wheel speed.

The stored program may cause the at least one processor to determine whether a lane in which the vehicle is traveling is curved based on the behavior data, and, when the lane is curved, determine whether a curvature of a lane line determined based on the image data corresponds to the behavior data.

The stored program may cause the at least one processor to correct the curvature of the lane line based on the behavior data and the image sensor information when the curvature of the lane line determined based on the image data does not correspond to the behavior data.

The stored program may cause the at least one processor to identify that a time delay is present in the image data based on the behavior data, and compensate for the time delay.

The stored program may cause the at least one processor to transmit the corrected lane line information to a driving assistance system.

The stored program may cause the at least one processor to calculate a first reliability for the behavior data and a second reliability for the image sensor information, and determine a first weight assigned to the behavior data and a second weight assigned to the image sensor information based on the calculated first reliability and the calculated second reliability.

The stored program may cause the at least one processor to correct the curvature of the lane line using the first weight and the second weight.

In accordance with some aspects of the present disclosure, an apparatus for driving assistance may include a camera installed to face forward from a vehicle, at least one memory including a stored program, and at least one processor configured to execute the stored program. The stored program may cause the at least one processor to acquire behavior data of the vehicle from at least one behavior sensor provided in the vehicle, acquire image data from the camera, acquires image sensor information based on the image data, identify that an error is present in lane line information included in the image sensor information, and correct the lane line information based on the acquired behavior data and the acquired image sensor information, resulting in corrected lane line information.

The behavior data may include data on at least one of a steering angle, a steering speed, a yaw rate, or a wheel speed.

The stored program may cause the at least one processor to determine whether a lane in which the vehicle is traveling is curved based on the behavior data, and, when the lane is curved, determine whether a curvature of a lane line determined based on the image data corresponds to the behavior data.

The stored program may cause the at least one processor to correct the curvature of the lane line based on the behavior data and the image sensor information when the curvature of the lane line determined based on the image data does not correspond to the behavior data.

The stored program may cause the at least one processor to identify that a time delay is present in the image data based on the behavior data, and compensate for the time delay.

The stored program may cause the at least one processor may calculate a first reliability for the behavior data and a second reliability for the image sensor information, and determine a first weight assigned to the behavior data and a second weight assigned to the image sensor information based on the calculated first reliability and the calculated second reliability.

The stored program may cause the at least one processor may correct the curvature of the lane line using the first weight and the second weight.

In accordance with some aspects of the present disclosure, a method for driving assistance may include acquiring behavior data of a vehicle from at least one behavior sensor provided in the vehicle, acquiring lane line information from at least one of image data acquired from at least one camera provided in the vehicle or image sensor information based on the image data, identifying that the lane line information included in the image sensor information does not correspond to the behavior data, and correcting the lane line information based on the behavior data and the image sensor information.

The behavior data may include data on at least one of a steering angle, a steering speed, a yaw rate, or a wheel speed.

The correcting of the lane line information may include determining whether a lane in which the vehicle is traveling is curved based on the behavior data, and, when the lane is curved, determining whether a curvature of a lane line determined based on the image data corresponds to the behavior data.

The correcting of the lane line information may include, when the curvature of the lane line determined based on the image data does not correspond to the behavior data, correcting the curvature of the lane line based on the behavior data and the image sensor information.

The correcting of the lane line information may include identifying that a time delay is present in the image data based on the behavior data, and compensating for the time delay.

BRIEF DESCRIPTION OF THE DRAWINGS

The above and/or other aspects of the disclosure will become apparent and more readily appreciated from the following description of some examples of embodiments of the inventive concepts, taken in conjunction with the accompanying drawings in which.

DETAILED DESCRIPTION

Figure 1:
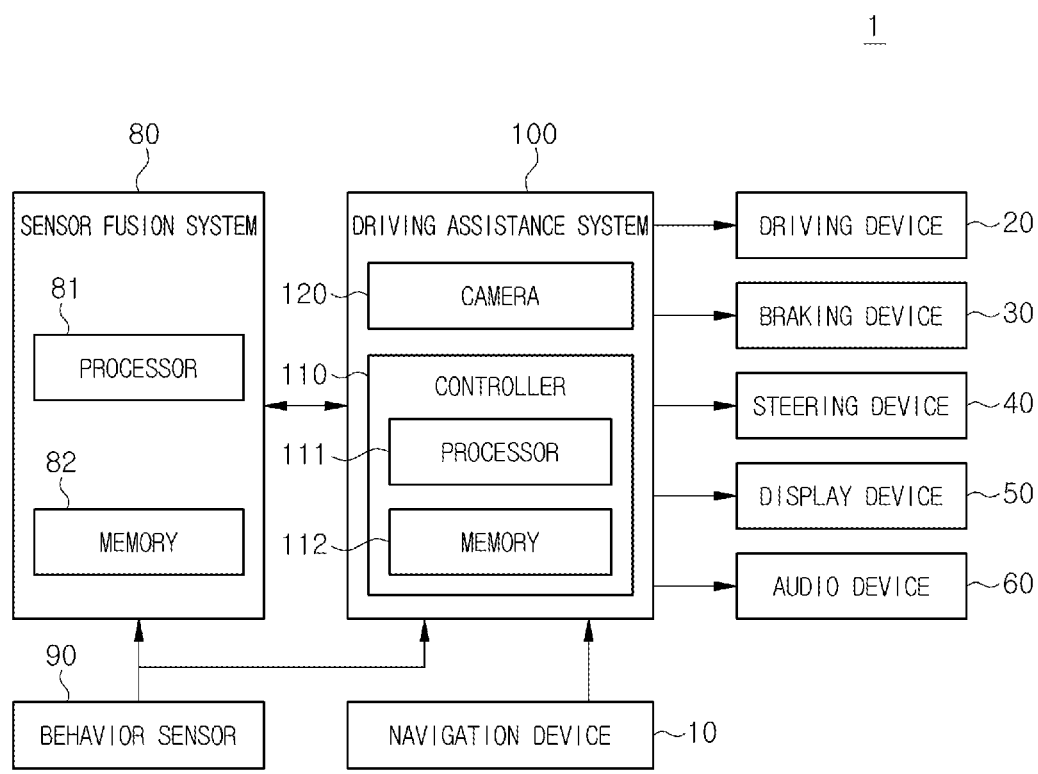
FIG. 1 is a block diagram illustrating a vehicle, and a sensor fusion system and a driving assistance system included in the vehicle, according to some embodiments.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be apparent to those of ordinary skill in the art. The progression of processing operations described herein is only one example, and the operations and/or sequence thereof are not limited to that set forth herein and may be changed as is known in the art, with the exception of operations which necessarily occur in a particular order. In addition, descriptions of well-known functions and constructions may be omitted herein for increased clarity and conciseness.

Additionally, some examples of embodiments will now be described more fully hereinafter with reference to the accompanying drawings. The inventive concepts may, however, be embodied in many different forms and should not be construed as being limited to the embodiments set forth herein. These embodiments are provided so that this disclosure will be thorough and complete and will fully convey the inventive concepts to those of ordinary skill in the art.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to some examples of embodiments of the present disclosure, which are illustrated in the accompanying drawings, wherein like reference numerals refer to like elements throughout.

Figure 2:
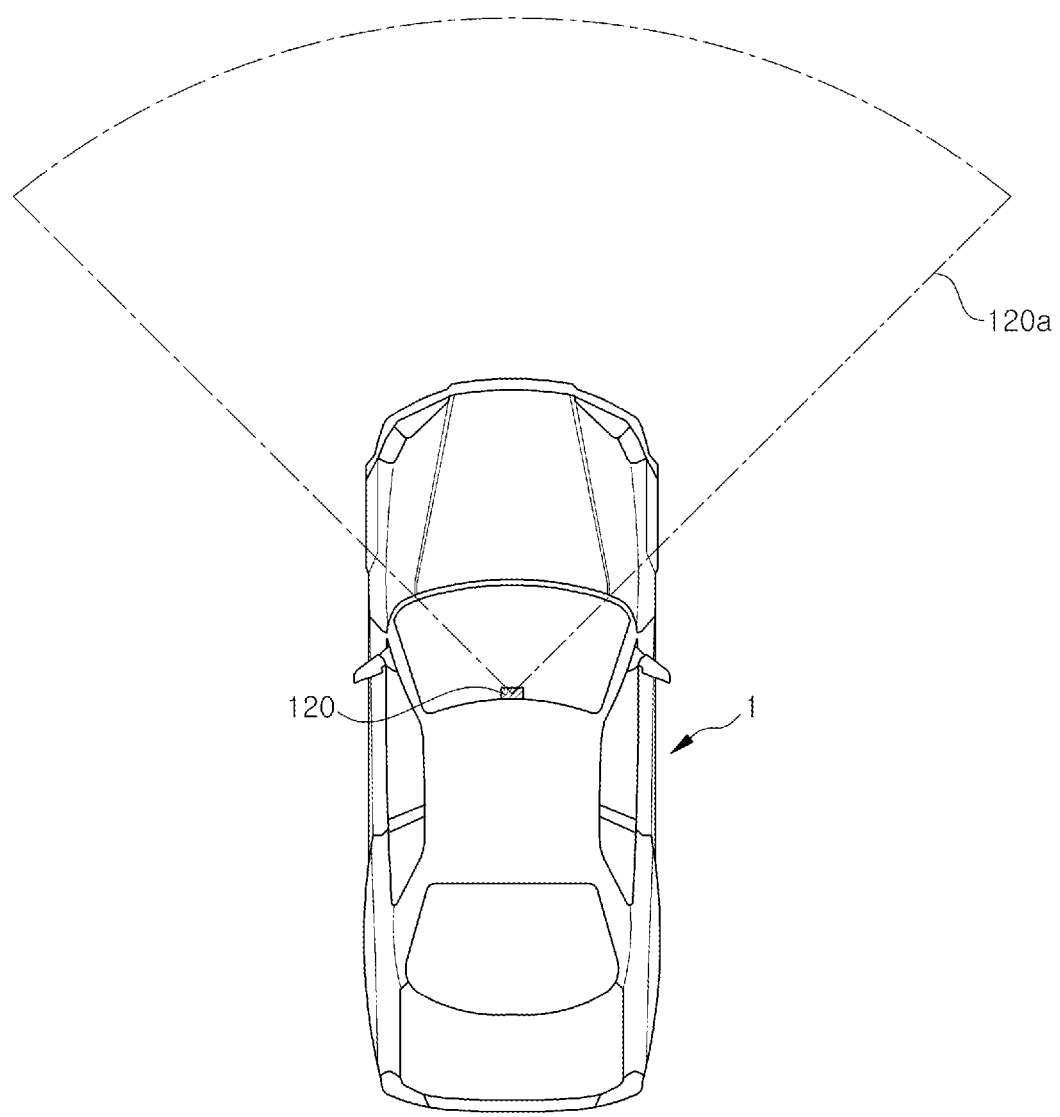
FIG. 2 is a view illustrating a field of view of a camera provided in the vehicle according to some embodiments.

FIG. 1 is a block diagram illustrating one example of a vehicle, and a sensor fusion system and a driving assistance system included in the vehicle, according to some embodiments, and FIG. 2 is a view illustrating a field of view of a camera provided in the vehicle according to some embodiments.

As illustrated in FIG. 1, a vehicle 1 may include a navigation device 10, a driving device 20, a braking device 30, a steering device 40, a display device 50, an audio device 60, and a driving assistance system 100.

In addition, the vehicle 1 may further include a behavior sensor 90 for detecting one or more dynamic characteristics or properties of the vehicle 1. For example, the behavior sensor 90 may include at least one of a vehicle speed sensor for detecting a longitudinal speed of the vehicle 1, an acceleration sensor for detecting a longitudinal acceleration and a transverse acceleration of the vehicle 1, and/or a gyro sensor for detecting a yaw rate, a roll rate, or a pitch rate of the vehicle 1.

The behavior sensor 90 may include at least one of a steering angle sensor for detecting a steering angle of the vehicle 1, a steering speed sensor for detecting a steering speed, and/or a wheel speed sensor for detecting a wheel speed.

In addition, the vehicle 1 may further include the driving assistance system 100 for driving assistance and a sensor fusion system 80 for fusing sensor information acquired from various sensors provided in the vehicle 1. A more detailed description of the driving assistance system 100 and the sensor fusion system 80 will be given below.

The navigation device 10 may generate a route to a destination input by a driver and provide the generated route to the driver. The navigation device 10 may receive Global Navigation Satellite System (GNSS) signals from a GNSS and identify an absolute position (coordinates) of the vehicle 1 based on the GNSS signal. The navigation device 10 may generate the route to the destination based on the position (coordinates) of the destination input by the driver and a current position (coordinates) of the vehicle 1.

As an example, the navigation device 10 may provide map data and position information of the vehicle 1 to the driving assistance system 100. In addition, the navigation device 10 may provide information on the route to the destination to the driving assistance system 100. Specifically, the navigation device 10 may provide the driving assistance system 100 with information on a distance to an entry lane for the vehicle 1 to enter another road, a distance to an exit lane for the vehicle 1 to exit from the road on which the vehicle 1 is currently traveling, etc.

The driving device 20 generates power (e.g., motive power) used in moving the vehicle 1. The driving device 20 may include, for example, an engine, an engine management system (EMS), a transmission, and a transmission control unit (TCU).

The engine may generate power for the vehicle 1 to travel, and the EMS may control the engine in response to an acceleration intention of the driver conveyed through an accelerator pedal and/or in response to a request of the driving assistance system 100. The transmission may transmit the power generated by the engine to wheels for acceleration, and the TCU may control the transmission in response to a transmission instruction of the driver conveyed through a transmission lever and/or in response to a request of the driving assistance system 100.

In some embodiments, the driving device 20 may include a driving motor, a reducer, a battery, a power control device, etc. In this case, the vehicle 1 may be implemented as an electric vehicle.

In some embodiments, the driving device 20 may include both engine-related devices and driving motor-related devices. In this case, the vehicle 1 may be implemented as a hybrid electric vehicle.

The braking device 30 may stop or decelerate the vehicle 1 and include, for example, a brake caliper and a brake control module (e.g., electric brake control module (EBCM)). The brake caliper may decelerate the vehicle 1 or stop the vehicle 1 using friction with a brake disk.

The EBCM may control the brake caliper in response to a braking intention from the driver conveyed through a brake pedal and/or in response to a request of the driving assistance system 100. For example, the EBCM may receive a deceleration request including a deceleration from the driving assistance system 100 and electrically or hydraulically control the brake caliper so that the vehicle 1 decelerates based on the requested deceleration.

The steering device 40 may include an electronic power steering control module (EPS). The steering device 40 may change a traveling direction of the vehicle 1, and the EPS may assist with an operation of the steering device 40 so that the driver may manipulate (e.g., more easily manipulate) a steering wheel in response to a steering intention of the driver conveyed through the steering wheel.

In addition, the EPS may control the steering device 40 in response to a request of the driving assistance system 100. For example, the EPS may receive a steering request including a steering torque from the driving assistance system 100 and control the steering device 40 to steer the vehicle 1 based on the requested steering torque.

The display device 50 may include a cluster, a head-up display, a center fascia monitor, etc., and may provide various pieces of information and/or entertainments to the driver through images and sounds. For example, the display device 50 may provide traveling information of the vehicle 1, a warning message, and/or the like to the driver.

The audio device 60 may include a plurality of speakers and may provide various pieces of information and/or entertainments to the driver through sounds. For example, the audio device 60 may provide traveling information of the vehicle 1, a warning message, and/or the like to the driver.

The driving assistance system 100 may receive the information on the route to the destination and the information on the position of the vehicle 1 from the navigation device 10 and receive the information on the vehicle speed, the acceleration, or the rates (e.g., the yaw rate, the roll rate, and/or the pitch rate) of the vehicle 1 from the behavior sensor 90.

The driving assistance system 100 may provide various functions for assisting the driver of the vehicle 1 and furthermore, may also be used for autonomous driving of the vehicle 1. For example, the driving assistance system 100 may provide functions of lane departure warning (LDW), lane keeping assist (LKA), high beam assist (HBA), autonomous emergency braking (AEB), traffic sign recognition (TSR), adaptive cruise control (ACC), blind spot detection (BSD), etc.

The driving assistance system 100 may include a camera 120 and a controller 110.

The camera 120 may capture surroundings of the vehicle 1 and may acquire image data of the surroundings of the vehicle 1. For example, as illustrated in FIG. 2, the camera 120 may be installed on a front windshield of the vehicle 1 and may have a forward field of view (FOV) 120a from the vehicle 1.

The camera 120 may include a plurality of lenses and an image sensor. The image sensor may include a plurality of photodiodes for converting light into electrical signals, and the plurality of photodiodes may be disposed in the form of a two-dimensional matrix.

The image data may include information on another vehicle, a pedestrian, a cyclist, or a lane line (marker for distinguishing a lane) positioned near the vehicle 1.

The driving assistance system 100 may include a processor 111 configured to process the image data of the camera 120, and the processor 111 may be, for example, a component included in the camera 120 or may be a component included in the controller 110.

The processor 111 may acquire image data from an image sensor of the camera 120 and detect and identify nearby objects of the vehicle 1 based on a result of processing the image data. For example, the processor 111 may generate tracks corresponding to nearby objects of the vehicle 1 using image processing and classify the generated tracks. The processor may identify whether the track corresponds to another vehicle, a pedestrian, or a cyclist, etc., and assign an identification code to the track.

In some embodiments, when the processor (e.g., processor 111) is a component included in the camera 120, the processor (e.g., processor 111) may transmit data (or positions and classifications of the tracks) on tracks (hereinafter referred to as "camera track") near the vehicle 1 to the controller 110. The controller 110 (e.g., processor 111 in the controller 110) may perform a driving assistance function based on the camera track.

In addition, although not illustrated in the drawings, the driving assistance system 100 may further include at least one of a radar or a light detection and ranging (LiDAR). The radar may transmit transmission radio waves toward the surroundings of the vehicle 1 and detect the nearby objects of the vehicle 1 based on reflected radio waves reflected from the nearby objects.

The radar may include a transmission antenna (or a transmission antenna array) for radiating transmission radio waves toward the surroundings of the vehicle 1 and a reception antenna (or a reception antenna array) for receiving reflection signals, that is, reflected radio waves that return after being reflected from objects.

The radar may acquire radar data from the transmission radio waves transmitted by the transmission antenna and the reflected radio waves received by the reception antenna. The radar data may include position information (e.g., distance information) or speed information of objects in front of and/or near the vehicle 1.

The driving assistance system 100 may include a processor configured to process the radar data, and the processor may be, for example, a component included in the radar or may be a component included in the controller 110. For example, the processor configured to process the radar data may be the same processor 111 configured to process the image data from the camera 120.

The processor may acquire the radar data from the reception antenna of the radar and generate tracks corresponding to the objects by clustering reflection points of the reflection signal. The processor may, for example, acquire a distance of the track based on a time difference between a transmission time of the transmission radio wave and a reception time of the reflected radio wave and acquire a relative speed of the track based on a frequency difference between the transmission radio wave and the reflected radio wave.

In some embodiments, when the processor is a component included in the radar, the processor may transmit data (or the distances and relative speeds of the tracks) on the tracks (hereinafter referred to as "radar track") near the vehicle 1 acquired from the radar data to the controller 110. The controller 110 (e.g., processor 111 in the controller 110) may perform a driving assistance function based on the radar track.

The LiDAR may emit light (e.g., infrared rays) toward the surroundings of the vehicle 1 and detect nearby objects of the vehicle 1 based on reflected light reflected from the nearby objects.

The LiDAR may include a light source (e.g., a light emitting diode, a light emitting diode array, a laser diode, or a laser diode array) for emitting light (e.g., infrared rays) and an optical sensor (e.g., a photodiode or a photodiode array) for receiving light (e.g., infrared rays). In some embodiments, the LiDAR may further include a driving device for rotating the light source or the optical sensor.

While the light source or the optical sensor rotates, the LiDAR may emit light through the light source and receive the light reflected from objects through the optical sensor, thereby acquiring LiDAR data.

The LiDAR data may include relative positions (distances or directions of nearby objects) or relative speeds of the nearby objects of the vehicle 1.

The driving assistance system 100 may include a processor for processing the LiDAR data, and the processor may be, for example, a component included in the LiDAR or may be a component included in the controller 110. For example, the processor configured to process the LiDAR data may be the same processor 111 configured to process the image data from the camera 120.

The processor may generate tracks corresponding to objects by clustering reflection points by the reflected light. The processor may, for example, acquire a distance to the object based on a time difference between a light transmission time and a light reception time. In addition, the processor may acquire a direction (or an angle) of the object with respect to a traveling direction of the vehicle 1 based on a direction in which the light source emits light when the optical sensor receives the reflected light.

In some embodiments, when the processor is a component included in the LiDAR, the processor may transmit data (or the distances and relative speeds of the tracks) on the tracks (hereinafter referred to as "LiDAR track") near the vehicle 1 acquired from the LiDAR data to the controller 110. The controller 110 (e.g., processor 111 in the controller 110) may perform a driving assistance function based on the LiDAR track.

Both of the radar and LiDAR discussed above are optional in some embodiments, and thus the driving assistance system 100 does not necessarily include the radar or the LiDAR. Even when the radar or the LiDAR is not provided, as will be described below, it may be possible to improve the recognition performance of the camera 120 by fusing sensor information.

The controller 110 may be implemented as, for example, an electronic control unit (ECU) or a domain control unit (DCU) electrically connected to the camera 120.

In addition, the controller 110 may be electrically connected (e.g., connected) to other components of the vehicle 1, such as the navigation device 10, the driving device 20, the braking device 30, the steering device 40, the display device 50, the audio device 60, or the behavior sensor 90 via a vehicle communication network, discussed in greater detail below.

The controller 110 may process the image data of the camera 120 and provide control signals to the driving device 20, the braking device 30, or the steering device 40 based on the processing result.

The controller 110 may include at least one memory 112 in which a program for performing an operation to be described below is stored and at least one processor (e.g., processor 111) for executing the stored program.

The memory 112 may include non-volatile memories such as a flash memory, a read only memory (ROM), and an erasable programmable ROM (EPROM) and further include volatile memories such as a static dynamic random memory (SRAM) and a dynamic RAM (DRAM).

Based on a result of processing the image data, the processor may generate a driving signal, a braking signal, and/or a steering signal, which may control respectively the driving device 20, the braking device 30, and the steering device 40.

For example, the processor (e.g., processor 111) may evaluate risk of collision between the camera track acquired from the image data and the vehicle 1. The processor may control the driving device 20, the braking device 30, and/or the steering device 40 to move, steer, or brake the vehicle 1 based on the risk of collision between the camera track and the vehicle 1.

In addition, the processor may control the steering device 40 based on lane line information acquired from the image data or output a warning to a driver through the display device 50 or the audio device 60. In some embodiments of the present disclosure, by correcting the lane line information through sensor fusion, it may be possible to improve the recognition performance of the driving assistance system 100.

To this end, the sensor fusion system 80 according to some embodiments may be included in the vehicle 1. The sensor fusion system 80 may correct the lane line information acquired from the camera 120 based on the output of the behavior sensor 90. A more detailed description thereof will be given below.

The sensor fusion system 80 may include at least one memory 82 in which a program is stored (e.g., a stored program for fusing sensor information), and at least one processor 81 configured to execute the stored program.

The driving assistance system 100 according to some embodiments may communicate with the sensor fusion system 80, the navigation device 10, the behavior sensor 90, the driving device 20, the braking device 30, the steering device 40, the display device 50, and the audio device 60 via the vehicle communication network.

For example, the above-described components included in the vehicle 1 may transmit or receive data via the vehicle communication network such as Ethernet, media oriented systems transport (MOST), Flexray, a controller area network (CAN), or a local interconnect network (LIN).

The sensor fusion system 80 shown in FIG. 1 may be configured to perform the sensor fusion function described above and further described below, and in some embodiments may not be a separately-provided component provided in the vehicle 1. Therefore, in some embodiments, the sensor fusion system 80 may be implemented by any one of a plurality of ECUs provided in the vehicle 1, which may also perform other functions performed in the vehicle 1 than the sensor fusion function. In some embodiments, the sensor fusion system 80 may be implemented by one component of the driving assistance system 100.

Figure 3:
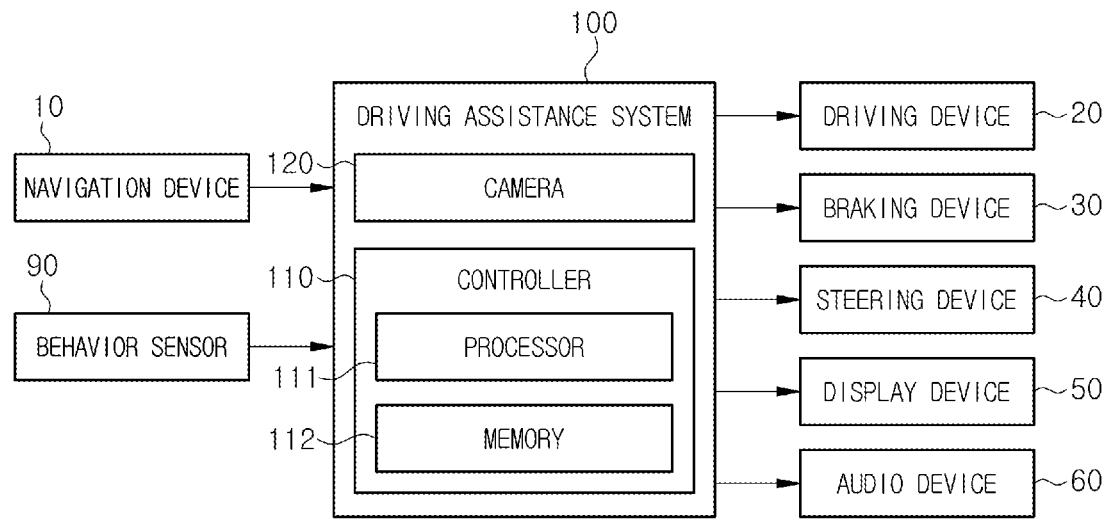
FIG. 3 is a block diagram illustrating an example of the vehicle and a driving assistance system included in the vehicle, according to some embodiments.

For example, FIG. 3 is a block diagram illustrating an example of the vehicle and the driving assistance system according to some embodiments.

In the example of FIG. 3, the sensor fusion function described in greater detail below may be performed by the driving assistance system 100. In this case, the separate sensor fusion system 80 is not provided, and the controller 110 of the driving assistance system 100 may instead correct the lane line information acquired from the camera 120 based on the output of the behavior sensor 90.

A description of the remaining components is the same as the contents described above with reference to FIGS. 1 and 2.

Figure 4:
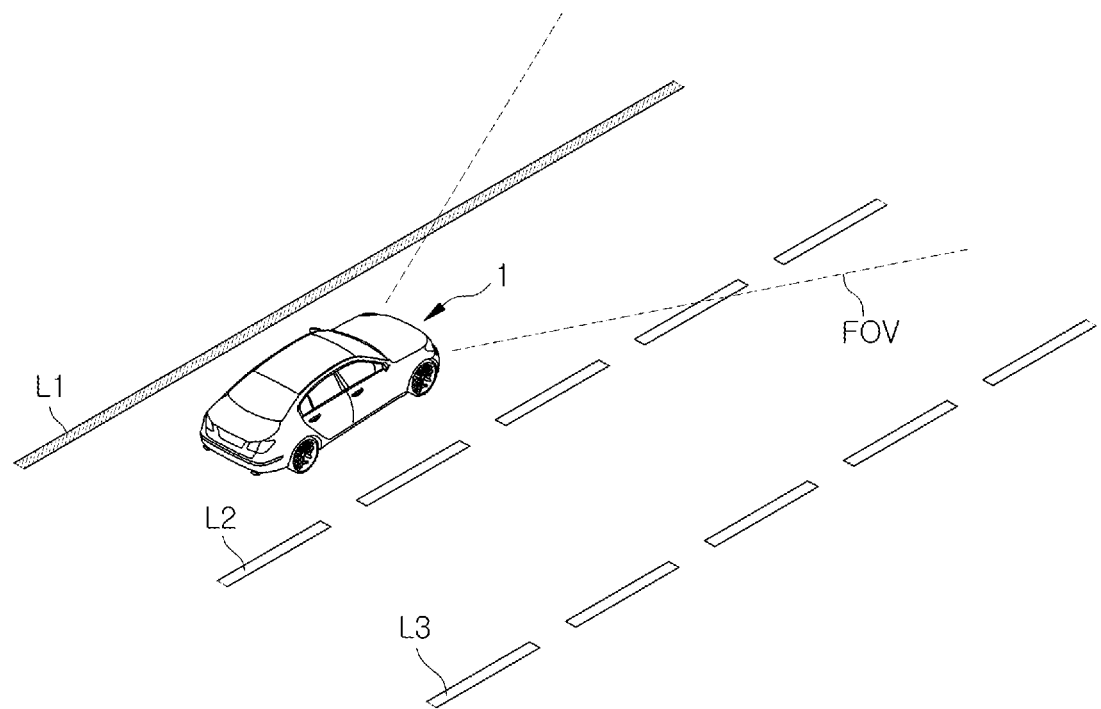
FIGS. 4 and 5 are views illustrating examples of information recognizable by the camera provided in the vehicle according to some embodiments.
Figure 5:
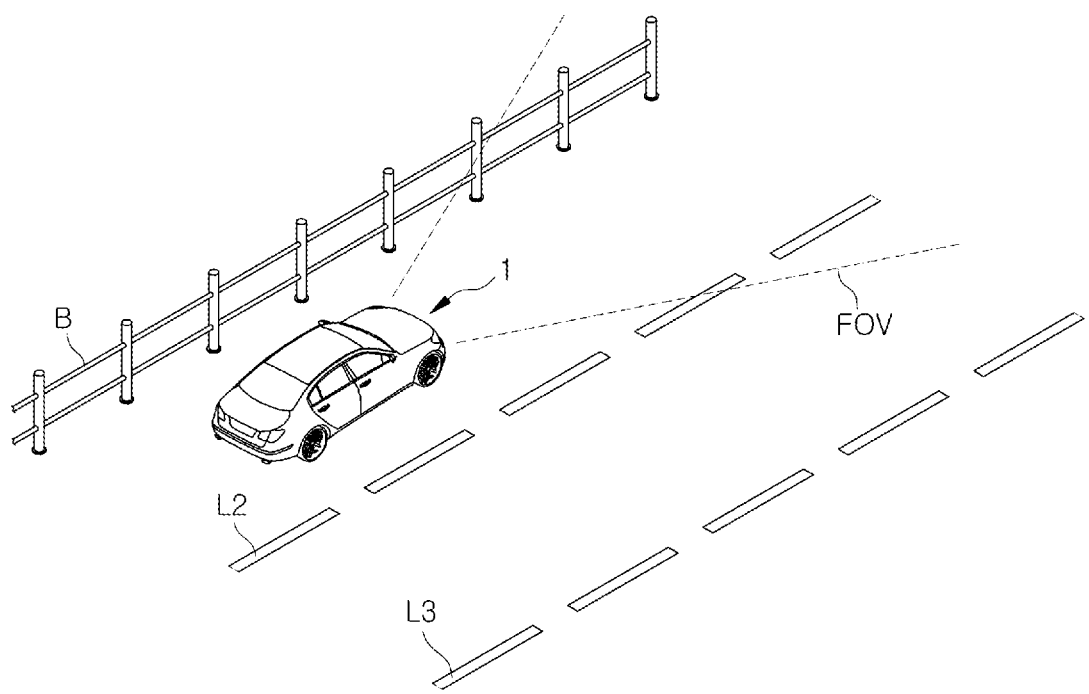
Figure 6:
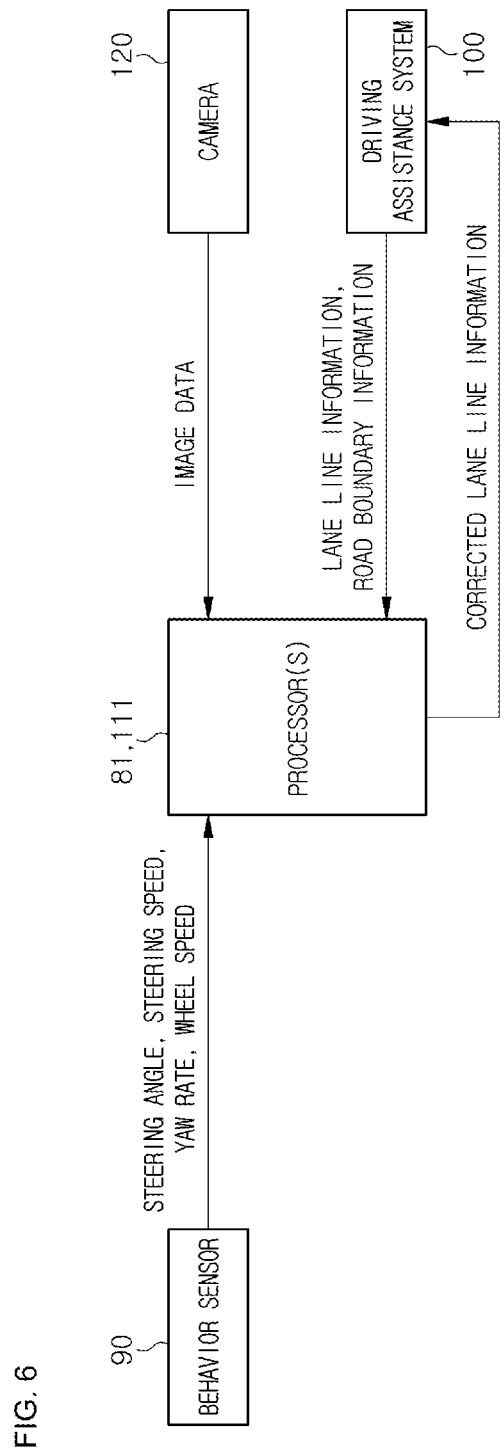
FIG. 6 is a block diagram illustrating an example of information collected for fusing sensor information.

FIGS. 4 and 5 are views illustrating examples of information recognizable by the camera provided in the vehicle according to some embodiments, and FIG. 6 is a block diagram illustrating an example of information collected for fusing sensor information.

Referring to FIG. 4, the camera 120 provided on the front (e.g., front windshield) of the vehicle 1 may capture lane lines L1 and L2 of a lane in which the vehicle 1 is currently traveling and a lane line L3 of a nearby lane. In addition, as illustrated in FIG. 5, a road boundary such as a median strip or a curb may be captured by the camera 120 according to a position of the vehicle 1.

That is, information on the lane lines of the lane in which the vehicle 1 is traveling, that is, lane line information may be acquired from the image data captured by the camera 120.

As illustrated in FIG. 6, the lane line information may be transmitted to, for example, the processor 81 of the sensor fusion system 80 and/or processor 111 of the driving assistance system 100 for performing the sensor fusion operation. When the sensor fusion operation is performed by the sensor fusion system 80, image sensor information may be transmitted from the driving assistance system 100 to the processor 81 of the sensor fusion system 80.

The image sensor information may be information acquired from the image data captured by the camera 120. For example, when the processor 111 processes the image data and recognizes a lane line of a travel lane or a lane line of a nearby lane, information on the corresponding lane line (hereinafter referred to as "lane line information") may be acquired, and the lane line information may include coordinate information, curvature information, etc., of lane lines in the image.

In addition, when the processor 111 processes the image data and recognizes a road boundary B such as a median strip, barrier, fence, or curb, the corresponding road boundary information may be acquired, and the road boundary information may include coordinate information, curvature information, etc., of road boundaries in the image.

When the sensor fusion operation is performed by the driving assistance system 100, the image data may be transmitted from the camera 120 to the processor 111, and the processor 111 may process the image data and determine the above-described image sensor information.

In addition, behavior data such as a steering angle, a steering speed, a yaw rate, a wheel speed detected by the behavior sensor 90 may be transmitted to the processors 81 of the sensor fusion system 80 (or, where the sensor fusion operation is performed by the processor 111 of the driving assistance system 100, to the processor 111).

The processor 81 of the sensor fusion system 80 and/or the processor 111 of the driving assistance system 100 may correct the lane line information by fusing the image sensor information and the behavior data. The corrected lane line information may be provided to the driving assistance system 100.

Figure 7:
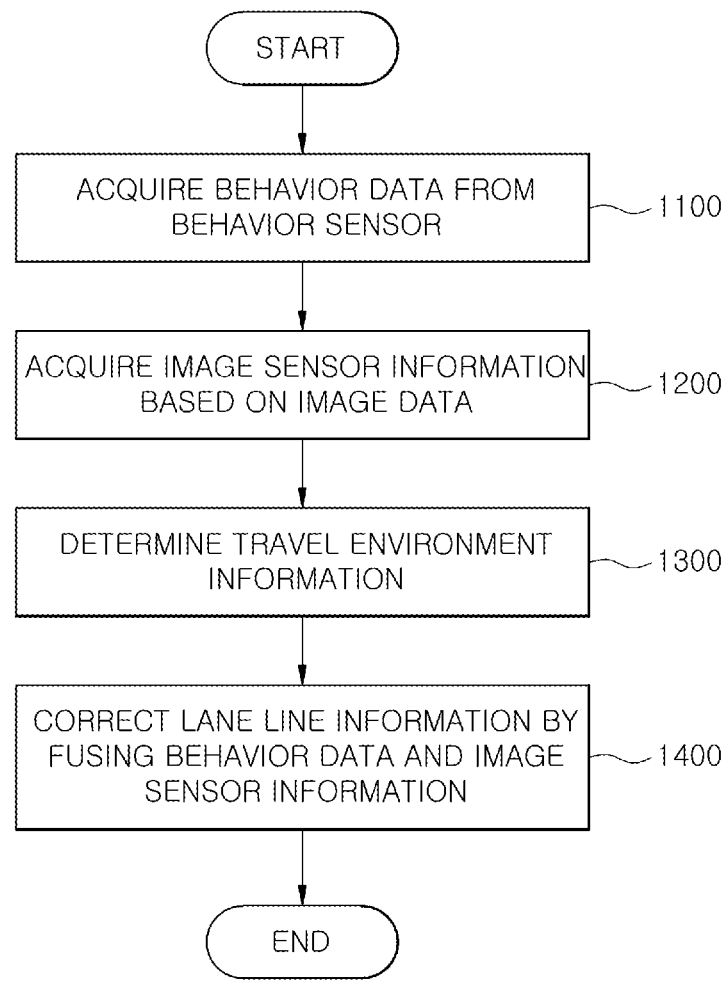
FIG. 7 is a flowchart of a sensor fusion method according to some embodiments.

FIG. 7 is a flowchart of a sensor fusion method according to some embodiments.

The sensor fusion method according to some embodiment may be performed by the vehicle 1, the sensor fusion system 80, and/or the driving assistance system 100. Therefore, the above descriptions of the vehicle 1, the sensor fusion system 80, and the driving assistance system 100 are also applicable to the sensor fusion method in the same manner even when not otherwise mentioned.

Referring to FIG. 7, the behavior data may be acquired from the behavior sensor 90 (1100), and the image sensor information based on the image data may be acquired (1200).

The behavior data may include data such as a steering angle, a steering speed, a yaw rate, and a wheel speed. The image data may be acquired from the camera 120, and in some embodiments the image sensor information based on the image data may be acquired by the processor 111 of the driving assistance system 100.

The processor 81 of the sensor fusion system 80 and/or the processor 111 of the driving assistance system 100 may determine travel environment information based on the behavior data (1300).

The travel environment information may include information on whether the lane on which the vehicle 1 is traveling is a curved lane, a straight road, a highway, an access/exit road of the highway, etc.

In addition, when determining the travel environment information, the processors 81 and/or 111 may use both the behavior data and the image sensor information. That is, the processors 81 and 111 may determine whether the lane in which the vehicle 1 is currently traveling is the curved lane, the straight road, the highway, the access/exit road of the highway, or the like based on the behavior data and the image sensor information.

The processors 81 and/or 111 may correct the lane line information by fusing the behavior data and the image sensor information (1400), resulting in corrected lane line information.

That is, when there is an error in the lane line information determined based on the image data, the processors 81 and/or 111 may correct the lane line information in consideration of both the behavior data acquired from the behavior sensor 90 and the image sensor information acquired from the camera 120. Hereinafter, specific examples will be described.

Figure 8:
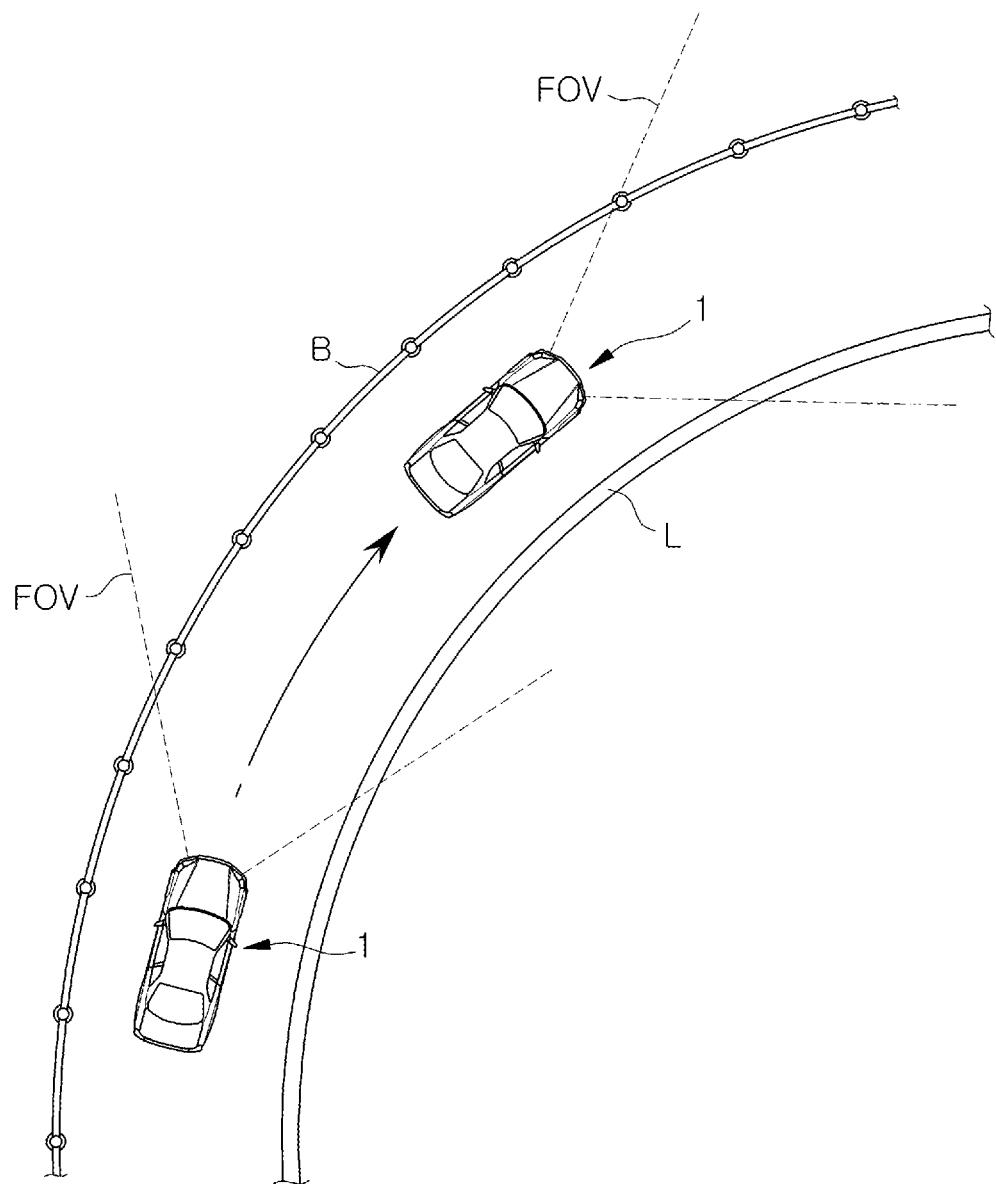
FIG. 8 is a view illustrating one example of a travel environment of the vehicle according to some embodiments.
Figure 9:
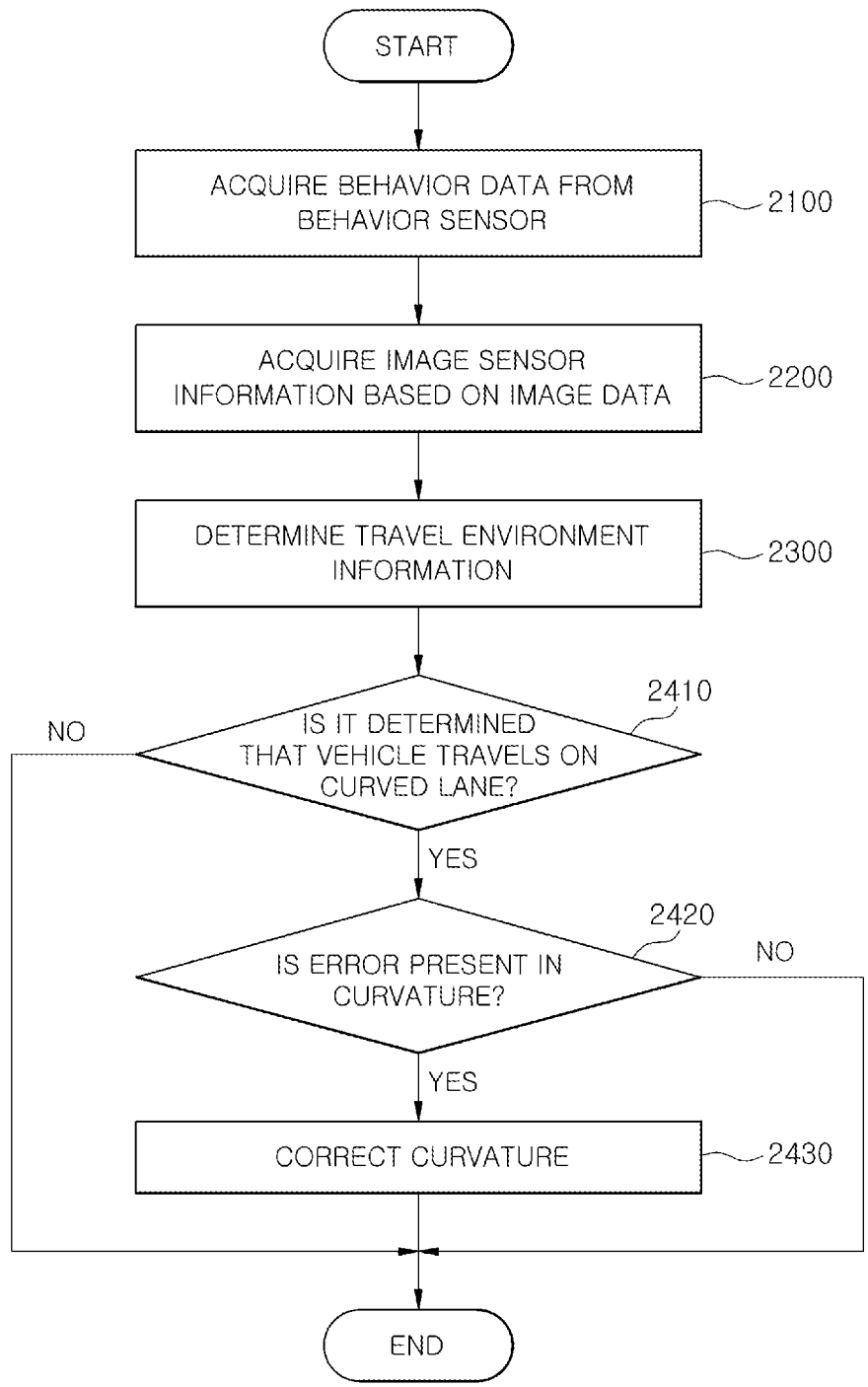
FIG. 9 is a flowchart illustrating an operation performed by the sensor fusion method according to some embodiments in the travel environment according to the example of FIG. 8.

FIG. 8 is a view illustrating one example of a travel environment of the vehicle according to some embodiments, and FIG. 9 is a flowchart illustrating an operation performed by the sensor fusion method according to some embodiments in the travel environment according to the example of FIG. 8.

Referring to FIG. 8, when the vehicle 1 travels on a curved lane, there is a possibility that an error occurs in the lane line information determined based on the image data due to the characteristics of the curve. According to the sensor fusion method according to some embodiments, the error may be corrected by fusing the information acquired from the sensors of the vehicle 1 without adding additional information or data from the camera 120, the optional radar, or the optional LiDAR.

Referring to FIG. 9, behavior data may be acquired from the behavior sensor 90 (2100), and the image sensor information based on the image data may be acquired (2200).

As a result of determining the travel environment information based on the behavior data or the behavior data and the image sensor information (2300), when it is determined that the vehicle 1 travels on the curved lane (YES direction in 2410), it may be determined or identified whether an error is present in a curvature (2420), and when the error is present in the curvature (YES direction in 2420), the curvature is corrected based on the behavior data and the image sensor information (2430). If it is determined or detected that the vehicle 1 is not travelling on a curved lane (NO direction in 2410) or if it is determined or identified that there is not an error present in the curvature (NO direction in 2420), then the lane line information may not be corrected.

In operation 2410, the processors 81 and/or 111 may determine whether the lane on which the vehicle 1 is currently traveling is the curved lane based on the behavior data such as a yaw rate and a steering angle. In some embodiments, the processors 81 and/or 111 may determine whether the lane is the curved lane in additional consideration of the image sensor information including the lane line information or the road boundary information.

The curvature of the lane line may be acquired by applying one of known methods of estimating a curvature of a lane line from image data.

The processors 81 and/or 111 may determine whether the error is present in the curvature based on the behavior data. For example, when the vehicle 1 travels on the curved lane, a yaw rate or steering angle of the vehicle 1 may vary depending on a curvature of an actual lane line. Therefore, in operation 2420, when the curvature acquired from the image data does not correspond to the yaw rate or steering angle of the vehicle 1, it may be determined that an error is present in the acquired curvature.

When the error is present in the acquired curvature, the processors 81 and/or 111 may correct the curvature based on the behavior data and the image sensor information. For example, the curvature may be corrected using the yaw rate or the road boundary information. When the acquired curvature is greater than a corresponding yaw rate value, the curvature may be corrected in a decreasing direction, and when the acquired curvature is smaller than the corresponding yaw rate value, the curvature may be corrected in an increasing direction.

In addition, it may be also possible to use both the yaw rate and the road boundary information. The road boundary information used at this time may include curvature information of e.g., the median strip, barrier, fence, or curb recognized from the image data.

In some embodiments, the reliability of both the image sensor information and the behavior data may be identified, and the correction of the curvature or the lane line information may be based on the identified reliability. For example, the reliability of the image sensor information and the behavior data may be accumulatively calculated, and a different weight may be applied to each of the image sensor information and the behavior data according to the accumulated reliability.

The processors 81 and/or 111 may calculate a first reliability for the behavior data and a second reliability for the image sensor information and may determine a first weight assigned to the behavior data and a second weight assigned to the image sensor information based on the calculated first reliability and second reliability.

The processors 81 and/or 111 may correct the curvature of the lane line by reflecting the first weight and the second weight. As a result, a relatively greater weight may be applied to a value with the higher reliability among the image sensor information and the behavior data, and the correction to the curvature may be more affected by the value having the relatively greater weight.

The lane line information corrected as described above may be used for the driving assistance system 100 to assist the traveling of the vehicle 1 or the driving of the driver of the vehicle 1. Therefore, when the lane line information is corrected by the sensor fusion system 80, the corrected lane line information may be transmitted to the driving assistance system 100.

When the lane line information is corrected by the driving assistance system 100, the driving assistance system 100 may perform driving assistance operations using the corrected lane line information.

Figure 10:
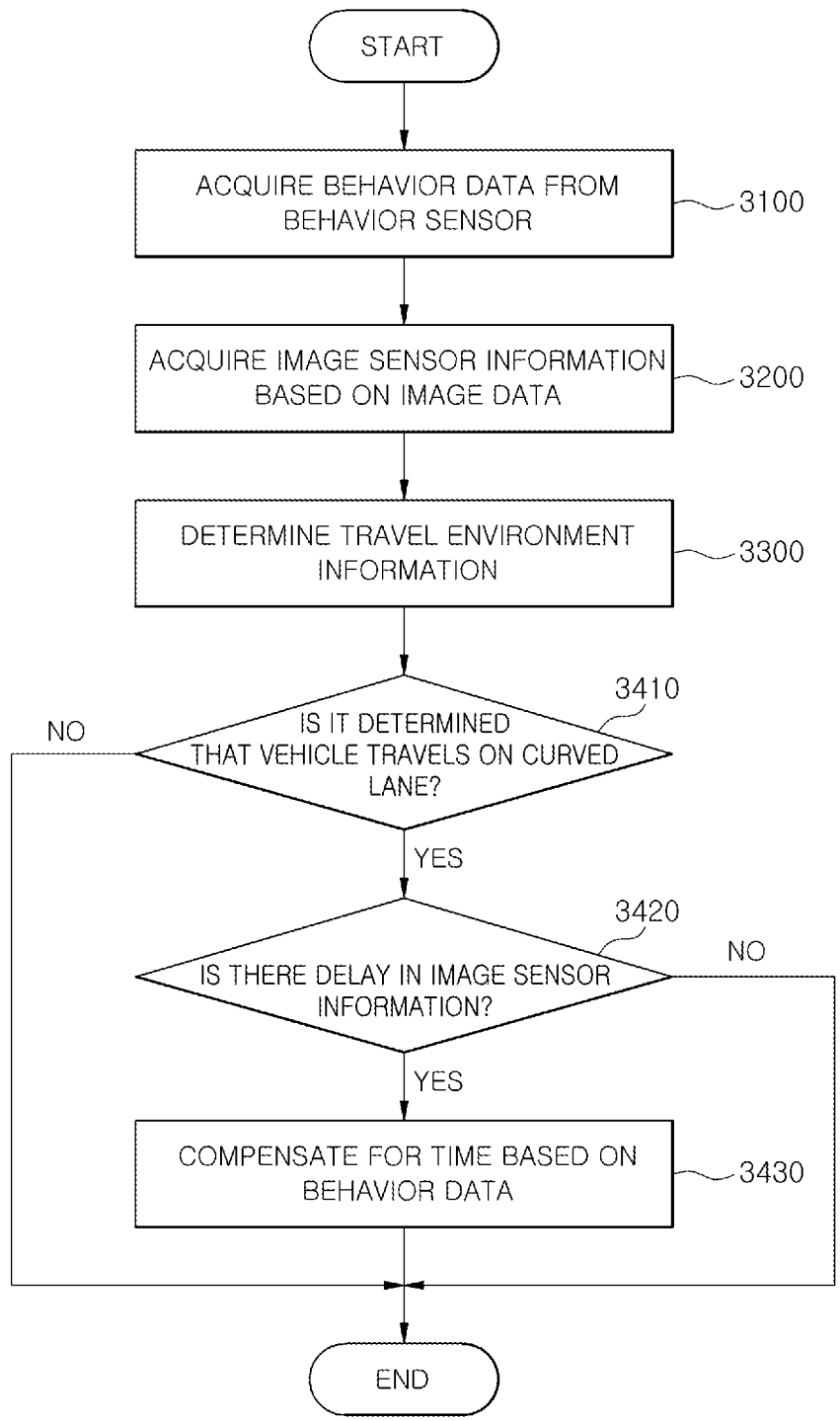
FIG. 10 is a flowchart of another example of the sensor fusion method according to some embodiments.

FIG. 10 is a flowchart of another example of the sensor fusion method according to some embodiments.

Referring to FIG. 10, the behavior data may be acquired from the behavior sensor 90 (3100), and the image sensor information based on the image data may be acquired (3200).

As a result of determining the travel environment information based on the behavior data or the behavior data and the image sensor information (3300), when it is determined that the vehicle 1 travels on the curved lane (YES direction in 3410), it may be determined whether there is a delay in the image sensor information (3420), and when there is the delay in the image sensor information (YES direction in 3420), a time may be corrected or compensated for based on the behavior data (3430).

For example, the processors 81 and/or 111 may determine whether there is the delay in the lane line information of the travel lane based on the behavior data, and when there is the delay in the lane line information, a delayed time may be compensated for based on the yaw rate and the steering angle. Specifically, the delayed time may be compensated for by comparing a steering point derived from the image sensor information with a steering point derived from the yaw rate and the steering angle. If it is determined or detected that the vehicle 1 is not travelling on a curved lane (NO direction in 3410) or if it is determined or identified that there is not a delay in the image sensor information (NO direction in 3420), then a correction or compensation may not be applied.

Meanwhile, although the flowchart of FIG. 10 is illustrated separately from the flowchart of FIG. 9, those skilled in the art will appreciate that the example of FIG. 10 and the example of FIG. 9 may be combined. Therefore, when it is determined that the vehicle 1 is traveling on the curved lane, the lane line information may be corrected based on at least one of the behavior data or the image sensor information, and a compensation may also be applied to the delayed time related to the lane line recognition.

As is apparent from the above description, by fusing data acquired from sensors for detecting a dynamic of a vehicle and information acquired from a camera, it is possible to increase the accuracy of lane line recognition without adding additional data from the camera, a radar, or a LiDAR. In some embodiments, improved accuracy of lane line recognition may be achieved even where are radar and/or LiDAR are not present on a vehicle.

Some examples embodiments of the present disclosure have been described above. In the embodiments described above, some components may be implemented as a module. Here, the term "module" means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described examples of embodiments, the inventive concepts can be implemented through computer readable code/instructions in/on a medium, e.g., a computer readable medium, to control at least one processing element to implement any above described embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While only a limited number of examples of embodiments have been described herein, those skilled in the art, having the benefit of this disclosure, will appreciate that other embodiments can be devised which do not depart from the scope as disclosed herein. Accordingly, the scope should be limited only by the attached claims.

What is claimed is:

1. An apparatus for driving assistance, the apparatus comprising:
   at least one memory including a stored program therein; and
   at least one processor configured to execute the stored program,
   wherein the stored program is configured to cause the at least one processor to:
      acquire behavior data of a vehicle from at least one behavior sensor provided in the vehicle;
      acquire lane line information from image data of a lane line near by the vehicle acquired from at least one camera provided in the vehicle or from image sensor information based on the image data;
      calculate a first reliability for the behavior data and a second reliability for the image sensor information;
      determine a first weight assigned to the behavior data and a second weight assigned to the image sensor information based on the first reliability and the second reliability; and
      correct the lane line information using the first weight and the second weight.

2. The apparatus of claim 1, wherein the behavior data comprises data on at least one of a steering angle of the vehicle, a steering speed of the vehicle, a yaw rate of the vehicle, or a wheel speed of the vehicle.

3. The apparatus of claim 1, wherein the lane line near by the vehicle is a lane line in which the vehicle is traveling,
   wherein the lane line information comprises curvature information, and
   wherein the stored program is further configured to cause the at least one processor to:
      determine whether the lane line in which the vehicle is traveling is curved based on the behavior data; and
      determine, based on determining that the lane line in which the vehicle is traveling is curved, whether the curvature information corresponds to the behavior data.

4. The apparatus of claim 3, wherein the stored program is further configured to cause the at least one processor to, when the curvature information does not correspond to the behavior data, correct the curvature information.

5. The apparatus of claim 1, wherein the stored program is configured to cause the at least one processor to identify that a time delay is present in the image data based on the behavior data, and compensate for the time delay.

6. The apparatus of claim 1, wherein the stored program is configured to cause the at least one processor to transmit the lane line information to a driving assistance system.

7. A system for driving assistance, the system comprising:
a camera installed on and facing forward of a vehicle;
at least one behavior sensor provided in the vehicle;
at least one memory including a stored program of machine-readable instructions; and
at least one processor configured to execute the stored program,
wherein the stored program is configured to cause the at least one processor to:
acquire behavior data of the vehicle from the at least one behavior sensor provided in the vehicle;
acquire image data from the camera;
acquire image sensor information based on the image data, wherein the image data comprises data of a lane line near by the vehicle;
calculate a first reliability for the behavior data and a second reliability for the image sensor information;
determine a first weight assigned to the behavior data and a second weight assigned to the image sensor information based on the first reliability and the second reliability; and
correct the image sensor information using the first weight and the second weight.

8. The system of claim 7, wherein the behavior data comprises data on at least one of a steering angle of the vehicle, a steering speed of the vehicle, a yaw rate of the vehicle, or a wheel speed of the vehicle.

9. The system of claim 7, wherein the lane line near by the vehicle is a lane line in which the vehicle is traveling,
wherein the image sensor information comprises curvature information of the lane line in which the vehicle is traveling, and
wherein the stored program is configured to cause the at least one processor to:
determine whether the lane line in which the vehicle is traveling is curved based on the behavior data; and
determine, based on determining that the lane line in which the vehicle is traveling is curved, whether the curvature information corresponds to the behavior data.

10. The system of claim 9, wherein the stored program is configured to cause the at least one processor to, when the curvature information does not correspond to the behavior data, correct the curvature information.

11. The system of claim 7, wherein the stored program is configured to cause the at least one processor to identify that a time delay is present in the image data based on the behavior data, and compensate for the time delay.

12. A method for driving assistance, the method comprising:
acquiring behavior data of a vehicle from at least one behavior sensor provided in the vehicle;
acquiring lane line information from image data of a lane line near by the vehicle acquired from at least one camera provided in the vehicle or from image sensor information based on the image data;
calculating a first reliability for the behavior data and a second reliability for the image sensor information;
determining a first weight assigned to the behavior data and a second weight assigned to the image sensor information based on the first reliability and the second reliability; and
correcting the lane line information using the first weight and the second weight.

13. The method of claim 12, wherein the behavior data comprises data on at least one of a steering angle, a steering speed, a yaw rate, or a wheel speed.

14. The method of claim 12, wherein the lane line near by the vehicle is a lane line in which the vehicle in traveling,
wherein the lane line information comprises curvature information, and
wherein the correcting the lane line information comprises:
determining whether lane line in which the vehicle is traveling is curved based on the behavior data; and
determining, based on determining that the lane line in which the vehicle is traveling is curved, whether the curvature information corresponds to the behavior data.

15. The method of claim 14, wherein the correcting of the lane line information comprises correcting the curvature information when the curvature information does not correspond to the behavior data.

16. The method of claim 12, wherein the correcting the lane line information comprises identifying that a time delay is present in the image data based on the behavior data, and compensating for the time delay.

17. The apparatus of claim 5, wherein the time delay is compensated for by comparing a first steering point derived from the image sensor information with a second steering point derived from a yaw rate and a steering angle of the vehicle.

18. The apparatus of claim 1, wherein the lane line near by the vehicle is a lane line in which the vehicle is traveling,
wherein the stored program is further configured to cause the at least one processor to determine whether the lane line in which the vehicle is traveling is curved based on the image sensor information,
wherein the image sensor information comprises road boundary information, and
wherein the road boundary information comprises curvature information of a median strip, a barrier, a fence, and/or a curb recognized from the image data.

19. The apparatus of claim 1, wherein the stored program is configured to cause the at least one process to correct the lane line information by comparing curvature information in the lane line information with a yaw rate of the vehicle in the behavior data,
wherein when curvature in the curvature information is greater than the yaw rate, the stored program is configured to cause the at least one process to correct the curvature in a decreasing direction, and
wherein when the curvature in the curvature information is smaller than the yaw rate, the stored program is configured to cause the at least one process to correct the curvature in an increasing direction.

* * * * *